(12) United States Patent
Sofia

(10) Patent No.: US 11,646,878 B2
(45) Date of Patent: May 9, 2023

(54) DISTRIBUTING ENCRYPTED DATA OBJECTS WITH ENCRYPTION INFORMATION AS METADATA

(71) Applicant: International Business Machines Corporation, Armonk, NY (US)

(72) Inventor: Anthony Thomas Sofia, Hopewell-Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 80 days.

(21) Appl. No.: 16/925,403

(22) Filed: Jul. 10, 2020

(65) Prior Publication Data

US 2022/0014365 A1    Jan. 13, 2022

(51) Int. Cl.
*H04L 9/08* (2006.01)
*H04L 9/14* (2006.01)
*H04L 9/40* (2022.01)

(52) U.S. Cl.
CPC .......... *H04L 9/0861* (2013.01); *H04L 9/0825* (2013.01); *H04L 9/0891* (2013.01); *H04L 9/14* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,904,521 B1 * | 6/2005 | Jivsov | H04L 51/30 713/155 |
| 8,165,302 B2 * | 4/2012 | Pedlow, Jr. | H04L 9/0822 380/277 |
| 8,649,515 B1 * | 2/2014 | Zhao | G06F 21/6209 380/202 |
| 10,015,144 B2 | 7/2018 | Katz et al. | |
| 10,033,703 B1 * | 7/2018 | Sharifi Mehr | G06F 21/6218 |

(Continued)

FOREIGN PATENT DOCUMENTS

EP    2805445 B1    3/2016

OTHER PUBLICATIONS

International Search Report and Written Opinion for Application No. PCT/EP2021/067134; International Filing Date: Jun. 23, 2021; dated Oct. 6, 2021; 12 pages.

(Continued)

*Primary Examiner* — Bassam A Noaman
(74) *Attorney, Agent, or Firm* — Cantor Colburn LLP; Edward Wixted

(57) ABSTRACT

Aspects include encrypting data based at least in part on a session key to generate encrypted data. The session key is encrypted based at least in part on a sender key to generate an encrypted session key. A request for an encrypted sender key index is transmitted to the key management system (KMS), the request includes an index of the sender key and an index of each of one or more additional keys. The encrypted sender key index is received from the KMS. An object that includes the encrypted data, the encrypted session key, the index of each of the one or more additional keys, and the encrypted sender key index is generated. Access to the data via the object is controlled based at least in part on whether a receiver has access to the sender key and to the one or more additional keys.

20 Claims, 10 Drawing Sheets

(56) References Cited

U.S. PATENT DOCUMENTS

| | | | |
|---|---|---|---|
| 2009/0138704 | A1 | 5/2009 | Delerablee |
| 2009/0178118 | A1* | 7/2009 | Cedo Perpinya ... H04W 12/068 726/3 |
| 2012/0263298 | A1 | 10/2012 | Suh et al. |
| 2015/0372991 | A1 | 12/2015 | Katz et al. |
| 2016/0241389 | A1* | 8/2016 | Le Saint ................... H04L 9/14 |
| 2016/0299924 | A1* | 10/2016 | Fujimoto ............ G06F 21/6227 |
| 2017/0126642 | A1* | 5/2017 | Basin ................... H04L 9/3226 |
| 2019/0363889 | A1* | 11/2019 | Wang ................... H04L 9/3236 |
| 2020/0067699 | A1 | 2/2020 | Resch et al. |
| 2021/0067324 | A1* | 3/2021 | Valente .................. H04L 9/088 |

OTHER PUBLICATIONS

J. Melen et al., "Host Identity Protocol-based Mobile Router (HIPMR)", https://tools.ietf.org/id/draft-melen-hip-mr-02.txt, May 26, 2009, 24 pages.

* cited by examiner

DISTRIBUTING ENCRYPTED DATA OBJECTS WITH ENCRYPTION INFORMATION AS METADATA

BACKGROUND

The present invention generally relates to data security, and more specifically, to distributing encrypted data objects with the encryption keys used for the encryption included as metadata of the data object.

Data protection and security is a multibillion dollar a year industry, yet data breaches still happen. This is due to many reasons, including the inherent difficulty in protecting data, competing standards of protection, many different hardware and software solutions, as well as the greatly varying skill levels of the individuals or organizations implementing the protection.

Security of data over networks and cloud solutions continues to be a growing concern as ever-increasing quantities of data is stored online. One way to protect data is with cryptography. Cryptography uses encryption keys and encryption algorithms to encrypt and decrypt data while sending it between two or more systems. Data protection over a network and cloud solutions may take two basic forms, protection in-flight and protection at-rest. In-flight protection protects data over the network and at-rest protection protects the data while it is in storage.

Presently, encryption keys such as symmetric keys, are primarily exchanged by encrypting the symmetric key using an asymmetric key before sending to the other side, by encrypting the symmetric key under a second symmetric key before sending to the other side, or by delivering the symmetric key using paper. Each of these common methods has a variety of problems. One of the most challenging problems is that a direct relationship must be established between the two parties to exchange symmetric keys. Establishing and managing this direct relationship is challenging, and the challenge is multiplied when keys expire quickly and/or many users are using the system. Other problems include slow transfer of keys and/or security breaches of the keys being exchanged.

Even if the exchange of keys can be well implemented, the keys must be managed and stored securely and allow for tracking of what key is used for which data. Typically, a given key may be selected to protect data based on business logic. Both the sender and the receiver must know what the business logic is to successfully determine that a particular key should be for a given piece of data. To do this, both sides must have a predefined relationship in order to exchange the necessary information about the key selection methodology and business logic.

Different approaches to key management have been used in an attempt to provide secure keys and to avoid the need for a direct relationship between the parties exchanging the encrypted data. Key management can be performed by a key management system (KMS) that generates, distributes and, more generally, manages cryptographic keys for clients (devices, applications, etc.). A KMS may handle several aspects of security, ranging from secure generation of keys to secure key handling and storage on the client systems. A KMS typically includes a backend functionality for key generation, distribution, and replacement. It may further integrate specific client functionalities for injecting keys, storing and managing keys on the client devices.

Contemporary KMSs have drawbacks. For example, they do not support the ability for multiple interested parties to independently control access to an encrypted data object after the encrypted data object is created without requiring multiple keys to be shared with a receiver of the object. In addition, contemporary approaches require the receiver of an encrypted data object to send an index, or other identifier, of an encryption key stored in the KMS in order to retrieve and send the encryption key to the receiver. This may cause a security breach if multiple data objects are encrypted with the same key and access to the key by the receiver has been revoked. Thus, although KMSs provide advantages in the management of encryption keys, security and access control could be improved.

SUMMARY

One or more embodiments of the present invention are directed to distributing encrypted data objects with encryption information as metadata. A non-limiting example computer-implemented method includes encrypting data based at least in part on a session key to generate encrypted data. The session key is encrypted based at least in part on a sender key that was previously obtained from a key management system (KMS) to generate an encrypted session key. A request for an encrypted sender key index is transmitted to the KMS, the request includes an index of the sender key and an index of each of one or more additional keys. The encrypted sender key index which was generated by the KMS based at least in part on the sender key and the one or more additional keys is received. An object that includes the encrypted data, the encrypted session key, the index of each of the one or more additional keys, and the encrypted sender key index is generated. Access to the data via the object is controlled based at least in part on whether a receiver has access to the sender key and to the one or more additional keys.

One or more embodiments of the present invention are directed to a system for distributing encrypted data objects with encryption information as metadata. A non-limiting example of the system includes a memory having computer-readable instructions and one or more processors for executing the computer-readable instructions. The computer-readable instructions may implement the above method.

One or more embodiments of the present invention are directed to a computer-program product for distributing encrypted data objects with encryption information as metadata, the computer-program product including a computer-readable storage medium having program instructions embodied therewith. The program instructions are executable by a processor to cause the processor to perform the above method.

Thus, advantageously, sharing data between multiple parties is facilitated while protecting the encryption keys and encryption key indexes from being distributed to all parties. In addition, the sender of the data and other interested parties control access to the data by invaliding their keys to render the encrypted data unusable.

Additionally, or alternatively to the above, in one or more embodiments of the present invention, access to the data via the object is further controlled based at least in part on whether the sender key and the one or more additional keys are valid. Thus, advantageously, access to the data can be revoked by the sender invalidating the sender key or by an authorized party invalidating one of the additional keys.

Additionally, or alternatively to the above, in one or more embodiments of the present invention, the receiver is prevented from accessing the data via the object by transmitting a request to the KMS to invalidate the sender key. Thus, advantageously, the management of the sender key can be centralized.

Additionally, or alternatively to the above, in one or more embodiments of the present invention, the receiver is prevented from accessing the data via the object, by transmitting a request to the KMS to invalidate at least one of the one or more additional keys. Thus, advantageously, the management of the sender key and access to the data can be centralized.

Additionally, or alternatively to the above, in one or more embodiments of the present invention, access to the data via the object is modified in response to the KMS adding or removing the requestor from a list of users having access to the sender key. Thus, advantageously, access to the data can be managed based on whether a user is in a group of users that has been given access to the sender key.

Additionally, or alternatively to the above, in one or more embodiments of the present invention, access to the data via the object is modified in response to the KMS adding or removing the receiver from a list of users having access to an additional key of the one or more additional keys. Thus, advantageously, access to the data can be managed based on whether a user is in a group of users that has been given access to the additional key.

Additionally, or alternatively to the above, in one or more embodiments of the present invention, the object is transmitted to the receiver. Thus, advantageously, the data and access management are distributed.

Additionally, or alternatively to the above, in one or more embodiments of the present invention, the object is transmitted to the receiver via a network. Thus, advantageously, the data and access management are distributed.

One or more embodiments of the present invention are directed to a computer-implemented method for distributing encrypted data objects with encryption information as metadata. A non-limiting example of the computer-implemented method includes receiving an object that includes encrypted data, an encrypted session key, an index of each of one or more additional keys, and an encrypted sender key index. A request is transmitted to a KMS for a sender key that corresponds to the encrypted sender key index. The request is from a requestor and the request includes the encrypted sender key index and the index of each of the one or more additional key. In response to receiving the sender key from the KMS, the encrypted session key is decrypted based at least in part on the sender key to generate a session key, and the encrypted data is decrypted based at least in part on the session key to generate unencrypted data. The sender key is sent to the requestor by the KMS in response to a determination by the KMS that the requestor has access to the sender key and to each of the one or more additional keys.

One or more embodiments of the present invention are directed to a system for distributing encrypted data objects with encryption information as metadata. A non-limiting example of the system includes a memory having computer-readable instructions and one or more processors for executing the computer-readable instructions. The computer-readable instructions may implement the above method.

One or more embodiments of the present invention are directed to a computer-program product for distributing encrypted data objects with encryption information as metadata, the computer-program product including a computer-readable storage medium having program instructions embodied therewith. The program instructions are executable by a processor to cause the processor to perform the above method.

Thus, advantageously, sharing data between multiple parties is facilitated while protecting the encryption keys and encryption key indexes from being distributed to all parties. In addition, the sender of the data and other interested parties control access to the data by to invalidating their keys to render the encrypted data unusable.

Additionally, or alternatively to the above, in one or more embodiments of the present invention, an error message is received from the KMS in response to a determination by the KMS that the requestor does not have access to the sender key. Thus, advantageously, the requestor is notified when access to the object is denied.

Additionally, or alternatively to the above, in one or more embodiments of the present invention, it is determined that the requestor does not have access to the sender key when the sender key is invalid. Thus, advantageously, access to the data can be revoked by the sender invalidating the sender key.

Additionally, or alternatively to the above, in one or more embodiments of the present invention, an error message is received from the KMS in response to a determination by the KMS that the requestor does not have access to of the at least one or more additional keys. Thus, advantageously, the requestor is notified when access to the object is denied.

Additionally, or alternatively to the above, in one or more embodiments of the present invention, it is determined that the requestor does not have access to all of the one or more keys when at least one of the one or more additional keys is invalid. Thus, advantageously, access to the data can be revoked by an authorized parity invalidating one of the additional keys.

One or more embodiments of the present invention are directed to a computer-implemented method for distributing encrypted data objects with encryption information as metadata. A non-limiting example of the computer-implemented method includes receiving a request for a sender key, the request from a requestor and the request including an encrypted sender key index and an index of each of one or more additional keys. It is determined whether the requestor has access to one or more additional keys identified by the index of each of the one or more additional key. In response to determining that the requestor has access to the one or more additional keys, the encrypted sender key index is decrypted to generate a sender key index and the sender key is located based at least in part on the sender key index. In addition, it is determined whether the requestor has access to the sender key. The sender key is transmitted to the requestor based on determining that the requestor has access to the sender key.

One or more embodiments of the present invention are directed to a system for distributing encrypted data objects with encryption information as metadata. A non-limiting example of the system includes a memory having computer-readable instructions and one or more processors for executing the computer-readable instructions. The computer-readable instructions may implement the above method.

One or more embodiments of the present invention are directed to a computer-program product for distributing encrypted data objects with encryption information as metadata, the computer-program product including a computer-readable storage medium having program instructions embodied therewith. The program instructions are executable by a processor to cause the processor to perform the above method.

Thus, advantageously, sharing data between multiple parties is facilitated while protecting the encryption keys and encryption key indexes from being distributed to all parties.

In addition, the sender of the data and other interested parties control access to the data by to invalidating their keys to render the encrypted data unusable.

Additionally, or alternatively to the above, in one or more embodiments of the present invention, the encrypted sender key index is generated based at least in part on the sender key index and the index of each of the one or more additional keys. Thus, advantageously, access to the data is protected by a plurality of keys each of which may be controlled by different authorized users.

Additionally, or alternatively to the above, in one or more embodiments of the present invention, the generating the encrypted sender key index includes locating the one or more additional keys based at least in part on an index of each of the one or more additional keys and combing them into a combined additional key. The sender key index is encrypted based at least in part on the combined additional key. Thus, advantageously, access to the data is protected by a plurality of keys each of which may be controlled by different authorized users.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
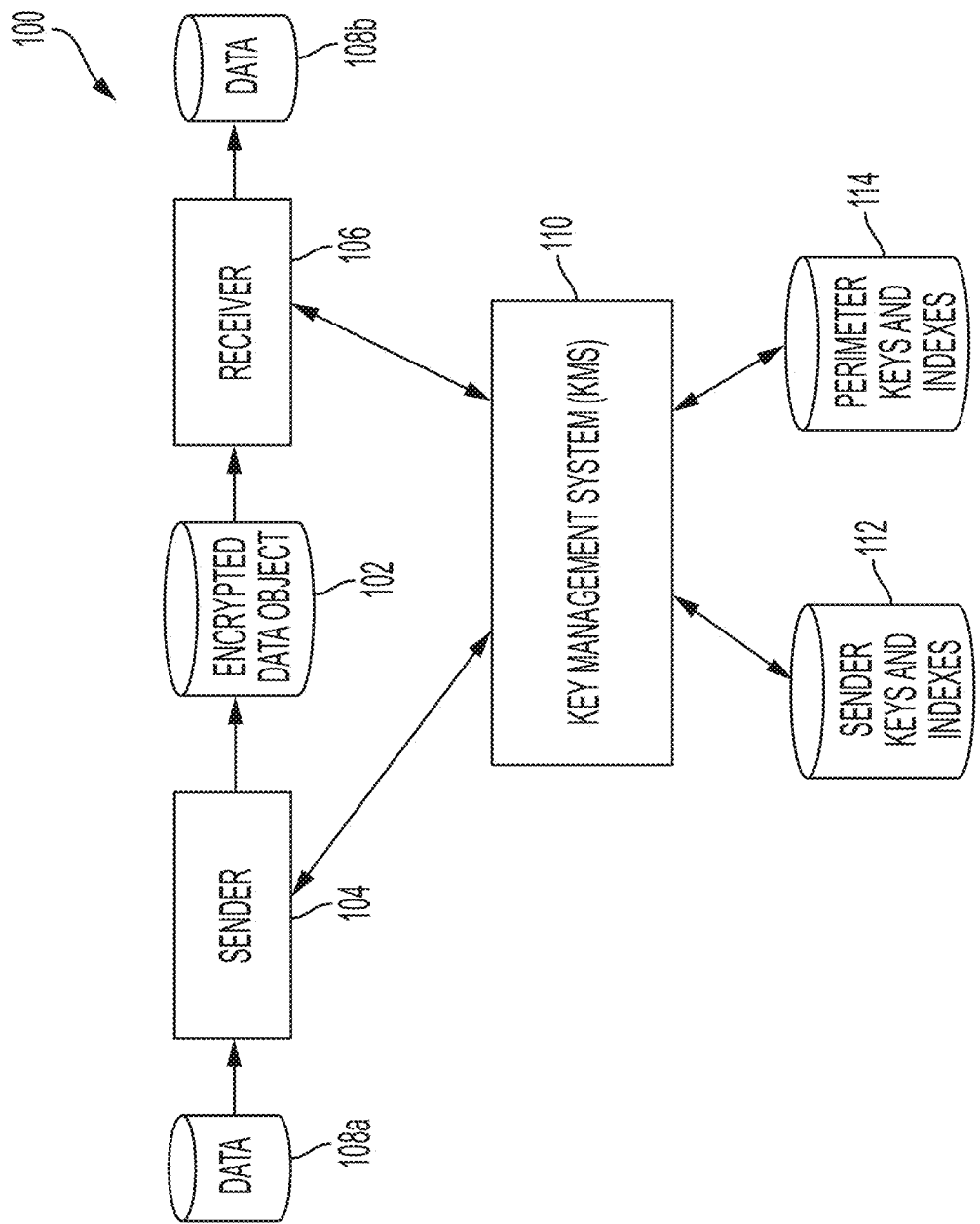
FIG. 1 depicts a block diagram of an environment for distributing encrypted data objects with encryption information as metadata according to one or more embodiments of the present invention.

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describe having a communications path between two elements and do not imply a direct connection between the elements with no intervening elements/connections between them. All of these variations are considered a part of the specification.

DETAILED DESCRIPTION

One or more embodiments of the present invention provide encrypted data objects that have the encryption keys used for the encryption of a data object available as metadata within the encrypted data object. In accordance with one ore more embodiments of the present invention, one party, a sender, encrypts the data with a sender key and one or more additional encryption keys belonging to one or more interested parties. This allows the sender and any of the other interested parties to invalidate their keys and render the encrypted data unusable.

One or more embodiments of the present invention facilitate sharing data between multiple parties (e.g., a sender and a receiver) while protecting the encryption keys from being distributed to all parties. By using a set of keys to protect the sender key information, one or more embodiments provide a facility for multiple parties to control consent to the data by either allowing or disallowing access to the sender key index. In addition, the sender can have final say on allowing or disallowing access as the sender controls their specific sender key.

One or more embodiments of the present invention package information about the sender key and one of more additional encryption keys along with the data being encrypted into an encrypted data object. In accordance with one or more embodiments of the present invention, the protected data, referred to herein as an "encrypted data object" includes one or more perimeter key indexes, an encrypted sender key index, an encrypted session key, and encrypted data.

As used herein, the term "session key" refers to the encryption key that is used by an encryption algorithm to encrypt data being encrypted by a sender, such as a sending processor. In accordance with one or more embodiments of the present invention, the sender can determine the best way to generate the session key. The session key can be obtained from a key management system (KMS) or it can be dynamically generated by the sender at some interval (e.g., per object, per day, per ten thousand objects, etc.). In accordance with one or more embodiments of the present invention, the session key (which is packaged with the object) is generated by the KMS but not stored by the KMS.

As used herein, the term "encrypted session key" refers to the session key after it has been encrypted with the sender key.

As used herein, the term "sender key" refers to the encryption key that is used by an encryption algorithm to encrypt the session key. The sender key is the encryption key that the sender uses for the data transfer. In accordance with one or more embodiments of the present invention, access to the sender key is controlled by a KMS. The KMS stores the sender key which is accessible via a sender key index. The sender key index is an identifier (e.g., label, handle) used by the KMS to locate the corresponding sender key.

As used herein, the term "perimeter key" is a key that defines a group of one or more parties (e.g., receivers) who can access the data. Examples of groups include but are not limited to users in the United States or users in a human resources department, or an identifier of a specific user. The perimeter keys provide a way for users to take an interest in the ability to open data. Access to a perimeter can be granted, modified, and/or revoked by a party other than the sender, and thus allow the other party to control access to the data. In accordance with one or more embodiments of the present invention, access to the perimeter keys is controlled by a KMS. The KMS stored the one or more perimeter keys. The perimeter key index is an identifier (e.g., label, handle) used by the KMS to locate the corresponding perimeter key.

As used herein, the term "combined perimeter key" refers to a composite encryption key that is derived from the one or more perimeter keys. In accordance with one or more embodiments of the present invention the combined perimeter key is derived by performing an exclusive or (XOR) on the values of the one or more perimeter keys. The combined perimeter key provides the ability to use multiple key parts to create a composite key. The composite key is created when the package, or encrypted data object, is created and then it is recreated when the encrypted data object is opened, or unencrypted. In the event that any of the key parts that went into creating the combined perimeter key are not available at the time of opening, the encrypted data will not be available from the point forward because it will not be possible to decrypt the encrypted data.

As used herein, the term "encrypted sender key index" refers to the index of the sender key in the KMS after it has been encrypted with the combined perimeter key index.

In accordance with one or more embodiments of the present invention, when the encrypted data object is being created, the sender uses the sender's sender key to encrypt the session key. As described previously, the sender key is controlled by the KMS and the sender requests the KMS to encrypt their sender key index with a combined perimeter key. The combined perimeter key includes at least one key (e.g., an organization's key), however it can also include more keys (e.g., a receiver key, additional keys that have other owners, random key components, etc.).

In accordance with one or more embodiments of the present invention, when the receiver of the encrypted data object (the "receiver") wants to open the encrypted data object, it will need to send the perimeter key index(es) and the encrypted sender key index to the KMS, and the KMS will provide the receiver with the sender key which can be used to decrypt the session key. In accordance with one or more embodiments, the KMS, upon receiving the perimeter key index(es) and the encrypted sender key index will first recombine the combined perimeter key, and if any of the components of the combined perimeter key are not available to the requestor, the operation will fail and the receiver will not be able to decrypt the encrypted data in the encrypted data object.

If all of the components of the combined perimeter key are available, they will be used by the KMS to decrypt the sender key index. The sender key index is then used by the KMS to find the sender key in the KMS. If the sender key is not available to the requestor, then the operation will fail, and the receiver will not be able to decrypt the encrypted data. If all of the key material is available and accessible by the requestor, then the sender key is returned by the KMS to the requesting receiver of the encrypted data object. In accordance with one or more embodiments of the present invention, keys are accessible by the requestor when the requestor has been given permission to access the keys.

The above described aspects of one or more embodiments of the present invention address one or more shortcomings of the prior art by facilitating the sharing of data while protecting the encryption keys and encryption key indexes from being distributed to all parties. In addition, using the set of perimeter keys to protect the sender key information allows multiple parties to control access to the data by either allowing or disallowing access to the sender key index. The sender has the final say on the ability of the requestor to access the data as the sender controls access to its corresponding sender key.

In addition, one or more embodiments of the present invention provide the receiver with a clear (unencrypted) sender key, however the receiver will not be able to tie the sender key back to its corresponding sender key index. Access to the data can be revoked by the sender invalidating their key (the sender key) and/or by the sender or other interested party with authority invalidating any of the keys that are part of the perimeter keys.

In addition, one or more embodiments of the present invention send perimeter key indexes instead of the perimeter keys to the receivers, thus reducing the risk of the perimeter keys being compromised.

Further, one or more embodiments of the present invention provide scaling of key usage, such that the same session key can be used for significant amounts of data, entirely local to the sender system. Then, the final wrapping operation for the session key, which is a small operation (e.g., uses a relatively small amount of computing resources), can be performed by the KMS.

One or more embodiments of the present invention can utilize the perimeter keys to define groups of one or more users who have access to the corresponding perimeter key and the intersection of the users in the groups corresponding to perimeter keys used to encrypt the data object are given access to the data object (as long as the sender has not revoked the sender key). An authorized administrator can update the users in each group.

In one example, the data may be human resource data, including data about United States (US) employees. In this example, a first perimeter key could require that the user be located in the US and a second perimeter key could require that the user be in a human resource department. These determinations about the user can be made based on metadata associated with computer user identifiers. For example, when a user identifier is set up for a user metadata can specify a geographic location and work department of the user. This metadata can be updated based on changes to the user's status. If the receiver of the encrypted data object has access to both the first and second perimeter keys (and the sender key) then the receiver is located in the US and is in a human resources department and can therefore access, or decrypt, the data in the encrypted data object. If the receiver does not have access to any of the first perimeter key, the second perimeter key, or the sender key, then the receiver cannot access the data in the encrypted data object. The example is intended to illustrate aspects of one or more embodiments of the present invention and is not intended to limit embodiments to human resource data as embodiments of the present invention can operate on any type of data.

To control access to the data in the encrypted data object, the data owner (e.g., sender) or other authorized party can instruct the KMS to revoke a specific user from having access to a perimeter key To prevent all future accesses to the data in the encrypted data object, the data owner or other authorized party can also instruct the KMS to invalidate a specific perimeter key. In addition, to prevent all future accesses to the data in the encrypted data object, the data owner (e.g., data sender) or other authorized party can also instruct the KMS to invalidate a sender key.

Turning now FIG. 1, a block diagram 100 of an environment for distributing encrypted data objects with encryption information as metadata is generally shown in accordance with one or more embodiments of the present invention. FIG. 1 includes a sender system 104, a receiver system 106, and a key management system (KMS) 110. FIG. 1 also includes data 108a and data 108b, referred to collectively herein as data 108, as well as encrypted data object 102, sender keys and indexes 112, and perimeter keys and indexes 114. In accordance with one or more embodiments of the present invention, data 108a and data 108b have the same value, data 108a is located on or accessible by the sender system 104 and data 108b is located on or accessible by receiver system 106.

Figure 8:
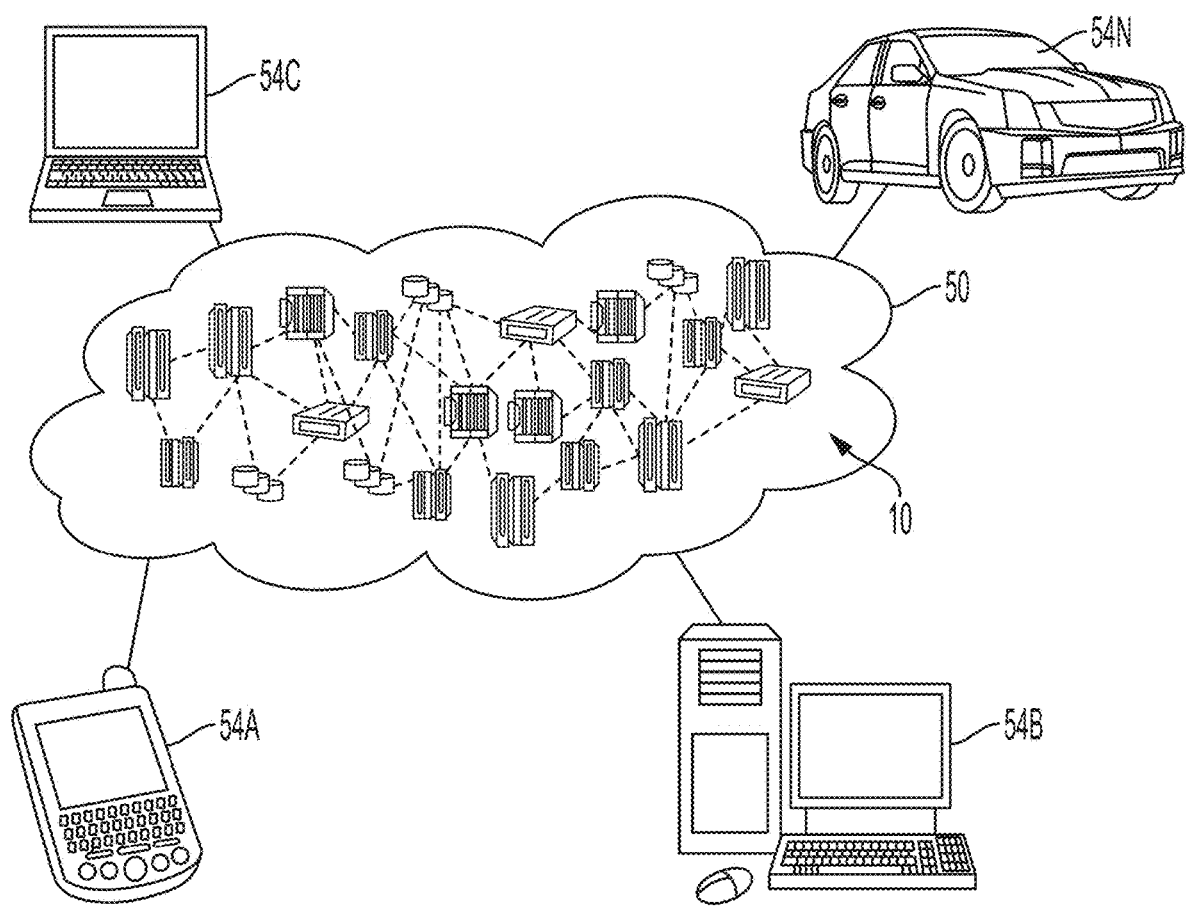
FIG. 8 depicts a cloud computing environment according to one or more embodiments of the present invention.
Figure 10:
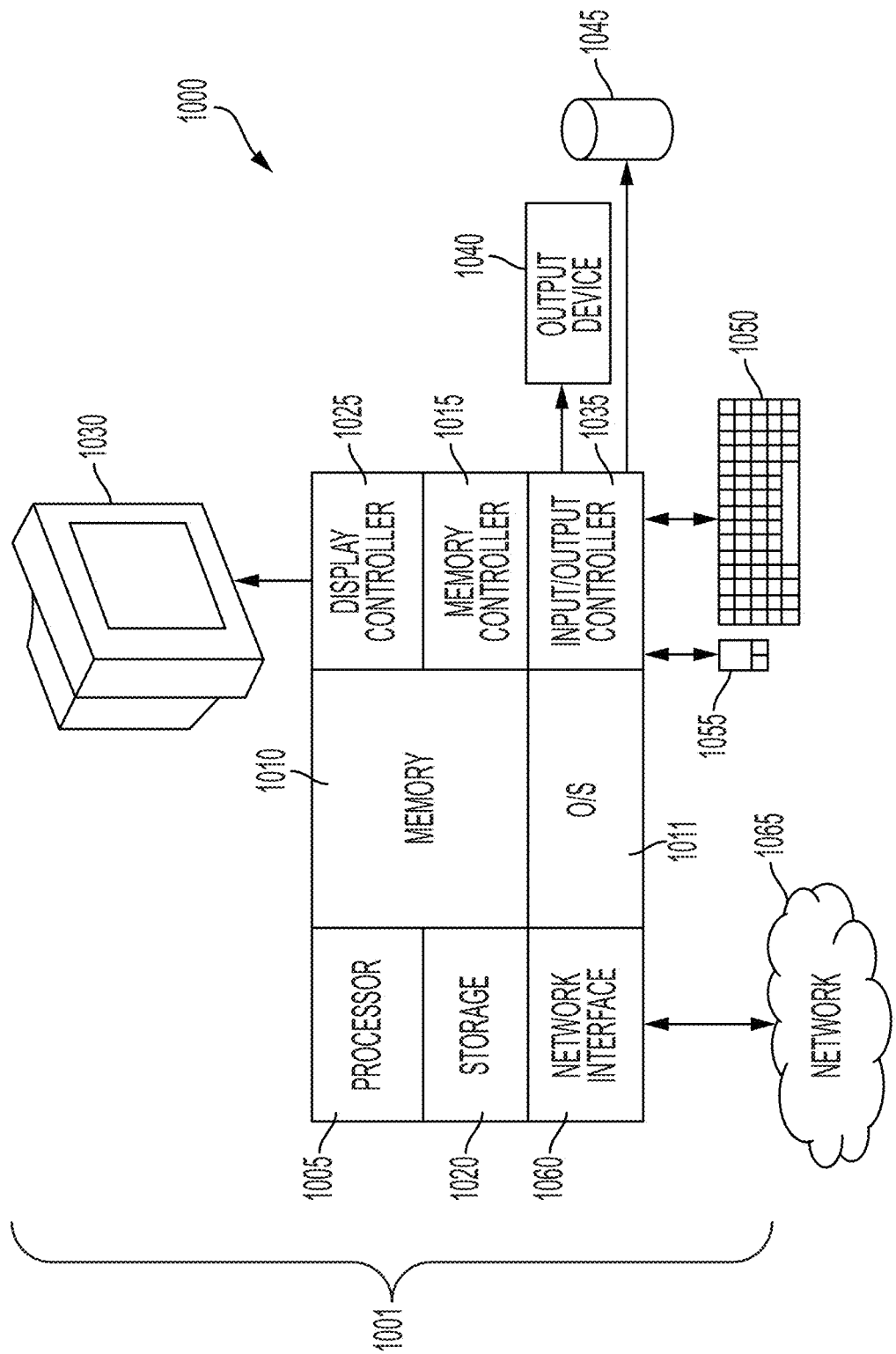
FIG. 10 illustrates a system for encrypting an object such that the creator of the encrypted object can be identified according to one or more embodiments of the present invention.

The sender system 104 can be implemented by computer hardware and/or software instructions executing, for example, on a processor 1005 located on computer 1001 of FIG. 10 and/or on a processor located on a cloud computing node 10 of FIG. 8, as further described herein. In accordance with one or more embodiments of the present invention, the sender system 104 performs the processing of the sender as described, for example, below with reference to FIG. 3. As shown in FIG. 1, the sender system 104 receives data 108a to be sent to receiver system 106 in a secure manner. The data 108a can be in any digital format known in the art. The sender system 104 creates an encrypted data object 102 that includes the data 108 in an encrypted format as well as metadata used by the receiver system 106 to decrypt the encrypted data object 102.

In accordance with one or more embodiments of the present invention, the sender system 104 stores or has access to the data 108a to be sent in a secure fashion, the encrypted data, an encrypted sender key index for an encrypted data object 102, a session key, a sender key index, a sender key, and to one or more perimeter key indexes.

As shown in the embodiment of FIG. 1, the sender system 104 interacts with the KMS 110 to generate the encrypted data object 102. As shown in FIG. 1, the KMS 110 controls access to the sender keys and indexes 112 which include sender keys and their corresponding index, or identifier. The KMS 110 uses the index of a sender key to access the corresponding sender key. As shown in FIG. 1, the KMS 110 also controls access to the perimeter keys and indexes 114 which include perimeter keys and their corresponding index, or identifier. The KMS 110 uses the index of a perimeter key to access the corresponding perimeter key.

The key management system (KMS) 110 can be implemented by computer hardware and/or software instructions executing, for example, on a processor 1005 located on computer 1001 of FIG. 10 and/or on a processor located on a cloud computing node 10 of FIG. 8, as further described herein. In accordance with one or more embodiments of the present invention, the KMS 110 performs the key management processing described below with reference to FIGS. 5 and 7. As shown in FIG. 1, the KMS 110 interacts with the sender system 104 for example, by receiving a sender key index and one or more perimeter key indexes from sender system 104 and in response returning an encrypted sender key index to the requesting sender system 104. The KMS 110 can also interact with the receiver system 106 for example, by receiving an encrypted sender key index and one or more perimeter key indexes from receiver system 106 and in response returning a sender key to the requesting receiver system 106. In addition, the KMS can receive commands from an owner of the data 108 or from another authorized party to update contents of the sender keys and indexes 112 and the perimeter keys and indexes 114.

The receiver system 106 can be implemented by computer hardware and/or software instructions executing, for example, on a processor 1005 located on computer 1001 of FIG. 10 and/or on a processor located on a cloud computing node 10 of FIG. 8, as further described herein. In accordance with one or more embodiments of the present invention, the receiver system 106 performs the processing of the receiver as described, for example, below with reference to FIG. 6. As shown in FIG. 1, the receiver system 106 receives an encrypted data object 102 from sender system 104. If the receiver system 106 has access to the data, the receiver system 106 decrypts the encrypted data object 102 to generate the data 108b in an unencrypted format.

The data 108, encrypted data object 102, sender keys and indexes 112, and perimeter keys and indexes 114 shown in FIG. 1 may be stored in any manner known in the art (e.g., database, indexed file, etc.) and at one or more location in one or more storage devices.

While FIG. 1 shows an embodiment that includes a single KMS 110, a single sender system 104, and a single receiver system 106, the invention is not limited to the embodiment shown in FIG. 1. For example, one or more other embodiments may have multiple sender systems 104, multiple receiver systems 106, and/or multiple KMSs 110.

All or a subset of the components shown in FIG. 1 can be communicating with each other via one or more networks formed by one or more processors that are communicatively coupled, or connected, using wired or wireless components. In accordance with one or more embodiments of the present invention all or a subset of the components shown in FIG. 1 are communicatively coupled via a cloud network and/or the Internet.

The embodiments described herein with respect to block diagram 100 of FIG. 1 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
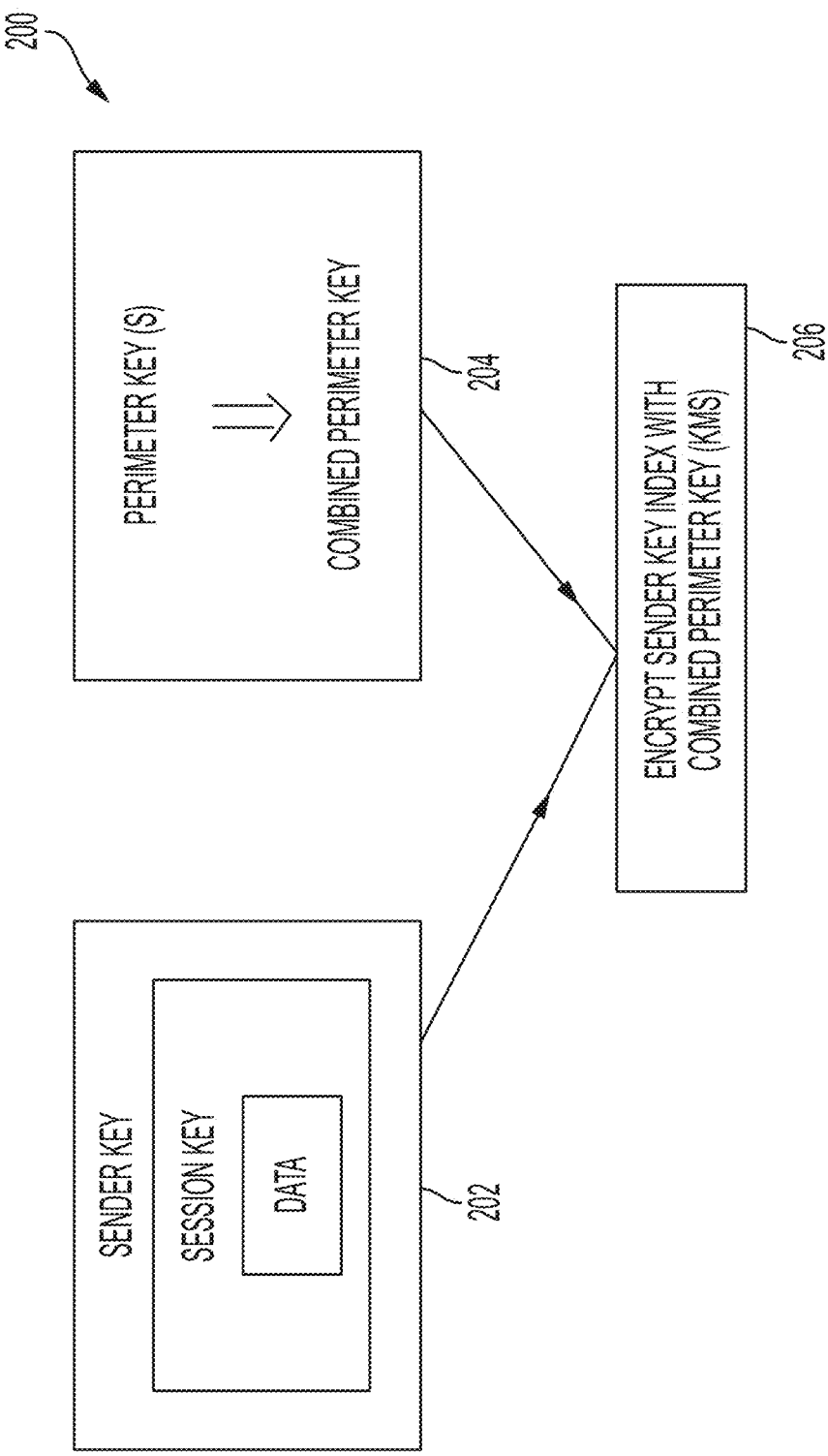
FIG. 2 depicts a block diagram of an encryption scheme utilized by one or more embodiments of the present invention.

Turning now to FIG. 2, a block diagram 200 of an encryption scheme utilized by one or more embodiments of the present invention is generally shown. As shown in FIG. 2 at block 202, data, such as data 108a of FIG. 1, is encrypted with a session key and the session key is encrypted with a sender key. As shown in block 204 of FIG. 2, the perimeter keys are combined to generate a combined perimeter key. The perimeter keys may be combined for example, by XORing their values or in some other repeatable manner such as, but not limited to using a key derivation function. As shown in block 206 of FIG. 2, the combined perimeter key is used to encrypt the index of the sender key that was used to encrypt the session key, resulting in the sender key encrypted with the combined perimeter key. Use of the embodiment of the encryption scheme shown in FIG. 2 provides the ability for not only the sender, but also multiple other interested parties or organizations to police access to the opening of the data through a KMS.

Figure 3:
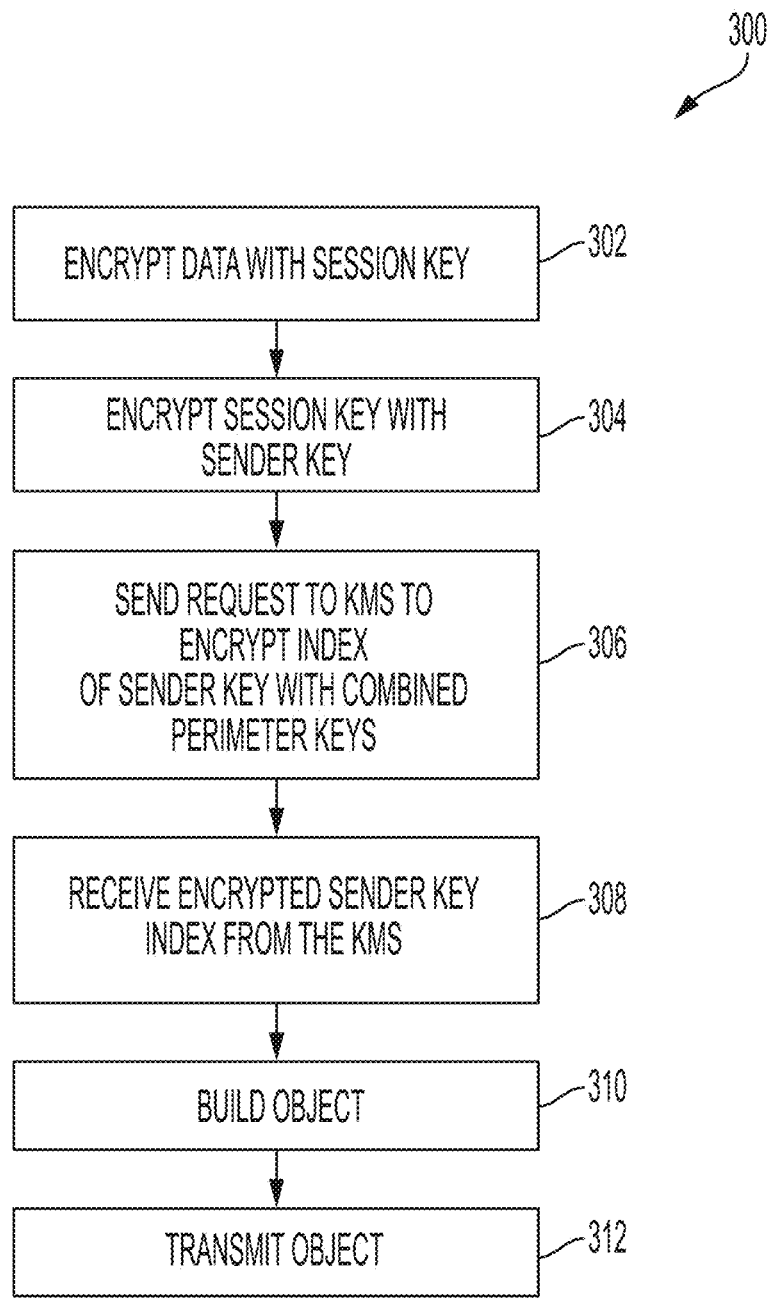
FIG. 3 depicts a flow diagram of a method for creating an encrypted data object according to one or more embodiments of the present invention.

Turning now to FIG. 3, a flow diagram of a method 300 for creating an encrypted data object is generally shown in accordance with one or more embodiments of the present invention. All or a portion of the processing shown in FIG. 3 can be performed, for example, by computer hardware and/or software instructions executing on sender system 104 of FIG. 1. At block 302, data, such as data 108a of FIG. 1, is received by the sender system and encrypted by the sender system using a session key. At block 304, the session key is encrypted with the sender key. Any encryption algorithm known the art may be utilized to perform the encryption at blocks 302 and 304, such as, but not limited to Advanced Encryption Standard (AES) in any of the available modes (e.g. Cipher Block Chaining (CBC), Galois/Counter Mode (GCM)) with any size key length (e.g., 128, 196, 256).

At block 306 of FIG. 3, the sender system sends a request to a KMS, such as KMS 110 of FIG. 1, to encrypt the index of the sender key with a combined perimeter key, and at block 308, the encrypted sender key index is received from the KMS. At block 310, the sender system builds an encrypted data object, such as encrypted data object 102 of FIGS. 1 and 4. Once the encrypted data object is generated at block 310 of FIG. 3, processing continues at block 312. At block 312, the encrypted data object is transmitted to a receiver, such as receiver system 106 of FIG. 1.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
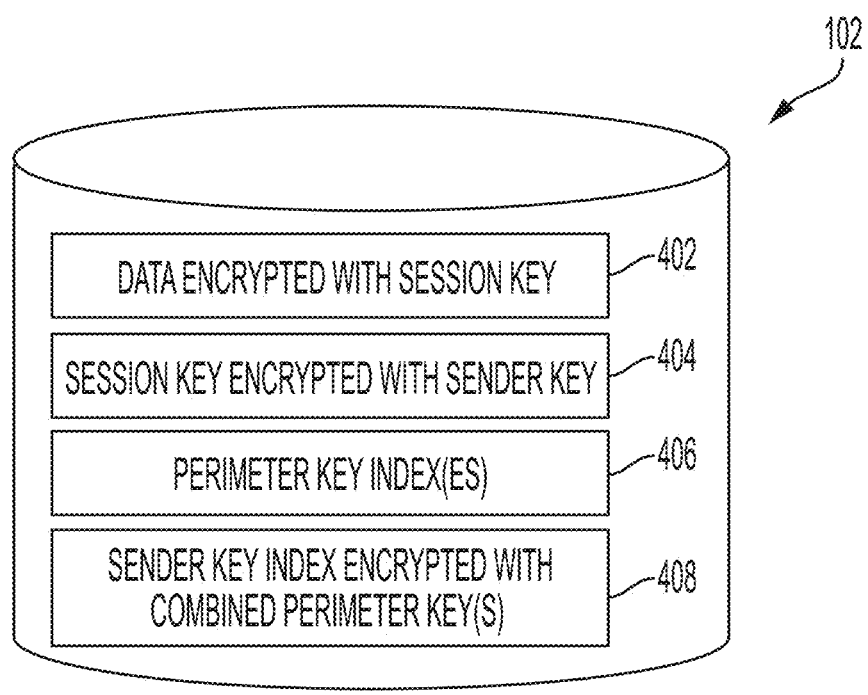
FIG. 4 depicts an encrypted data object according to one or more embodiments of the present invention.

Turning now to FIG. 4, an embodiment of the encrypted data object 102, or protected data, is generally shown in accordance with one or more embodiments of the present invention. The encrypted data object 102 shown in FIG. 4 includes data encrypted with the session key 402, the session key encrypted with the sender key 404, one or more perimeter key indexes 406, and a sender key index encrypted with a combined perimeter key 408.

Figure 5:
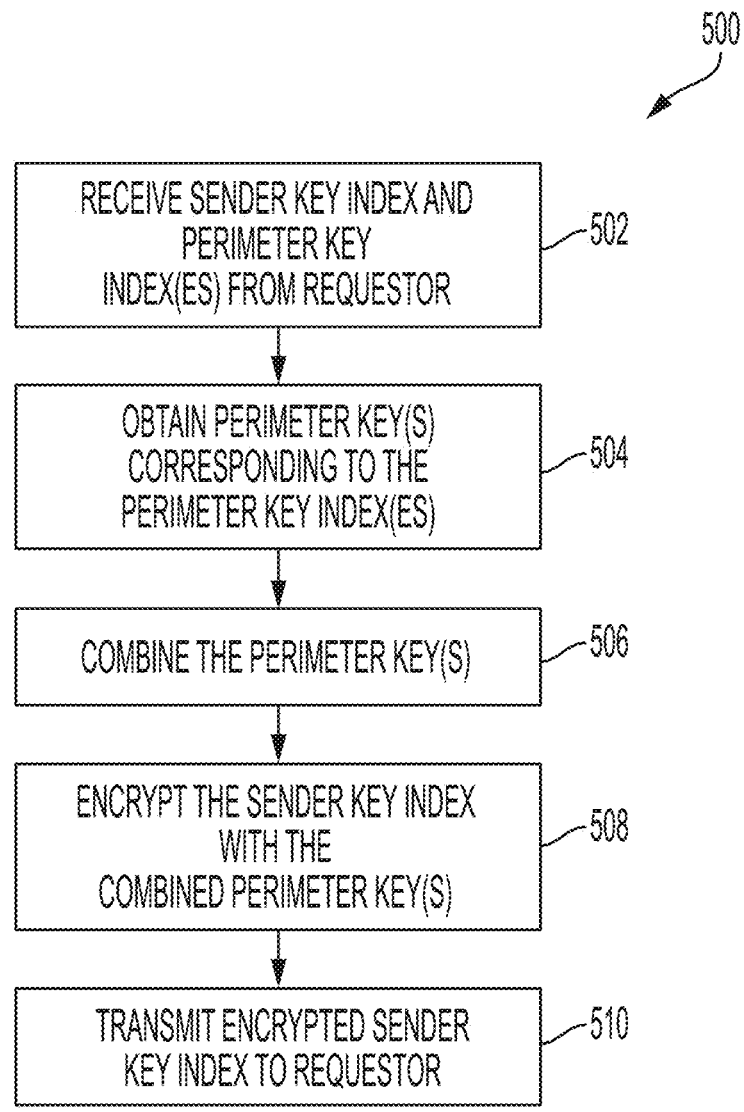
FIG. 5 depicts a flow diagram of a method for generating an encrypted sender key index according to one or more embodiments of the present invention.

Turning now to FIG. 5, a flow diagram of a method 500 for creating an encrypted sender key index, such as sender key index encrypted with combined perimeter key(s) 408 of FIG. 4, is generally shown in accordance with one or more embodiments of the present invention. All or a portion of the processing shown in FIG. 5 can be performed, for example, by computer hardware and/or software instructions executing on KMS 110 of FIG. 1. At block 502, a sender key index and one or more perimeter key indexes, such as perimeter key index(es) 406 of FIG. 4, are received from a requestor, such as sender system 104 of FIG. 1. Processing continues at block 504 with obtaining the one or more perimeter keys that correspond to the received perimeter key index(es). The corresponding perimeter keys can be obtained for example, from perimeter keys and indexes 114 of FIG. 1.

At block 506 of FIG. 5, the perimeter keys are combined and at block 508, the sender key index that was received at block 502 is encrypted with the combined perimeter keys. Any method of combining keys may be utilized such as, but not limited to: performing an exclusive OR (XOR) with the keys or using a key derivation function (e.g. HMAC-based Extract-and-Expand (HKDF), and/or Password Based Key Derivation Function 2 (PBKDF2)). Any encryption scheme known in the art may be utilized to encrypt the sender key index such as, but not limited to Advanced Encryption Standard (AES) in any of the available modes (e.g. Cipher Block Chaining (CBC), Galois/Counter Mode (GCM)) with any size key length (e.g., 128, 196, 256). The encrypted sender key index is transmitted to the requestor at block 510.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
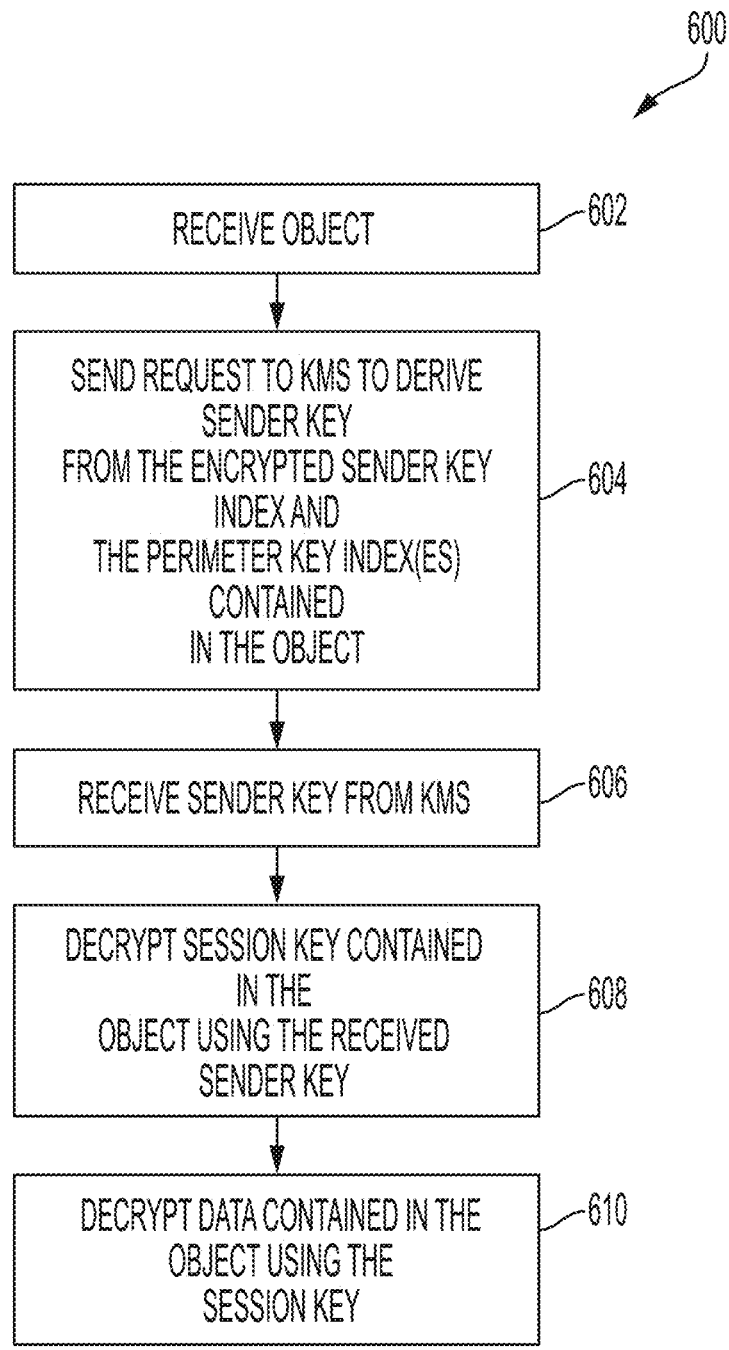
FIG. 6 depicts a flow diagram of a method for decrypting data contained in an encrypted data object according to one or more embodiments of the present invention.

Turning now to FIG. 6, a flow diagram of a method 600 for decrypting data contained in an encrypted data object is generally shown in accordance with one or more embodiments of the present invention. All or a portion of the processing shown in FIG. 6 can be performed, for example, by computer hardware and/or software instructions executing on receiver system 106 of FIG. 1. At block 602, an object, such as encrypted data object 102 of FIGS. 1 and 4 is received. In accordance with one or more embodiments of the present invention, the object includes data encrypted with a session key, the session key encrypted with a sender key, one or more perimeter key indexes, and a sender key index encrypted with a combined perimeter key.

At block 604, a request is sent to a KMS, such as KMS 110 of FIG. 1, to derive the sender key from the encrypted sender key index and the one or more perimeter key indexes contained in the received object. At block 606, the sender key is received from the KMS if the receiver system has been given access to all of the perimeter keys corresponding to the one or more perimeter key indexes in the received object and to the sender key, and the one or more perimeter keys and the sender key are valid keys in the KMS, meaning they have not been removed from the KMS previous to this request.

The sender key is not received from the KMS at block 606 if the receiver system has not been given access to all of the perimeter keys corresponding to the one or more perimeter key indexes in the received object and to the sender key, or if one or more of the perimeter keys or the sender key are invalid keys. When this occurs, in one or more embodiments of the present invention the KMS sends an error message to the requestor, and in other embodiments the KMS just does not respond to the request.

Block 608 is performed in response to the sender key being received at block 606. At block 608, the encrypted session key is decrypted using the received sender key. Processing continues at block 610 with decrypting the data encrypted with the session key in the object using the session key to generate unencrypted data, such as data 108b of FIG. 1. The data 108b can then be stored or input to a computer program.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
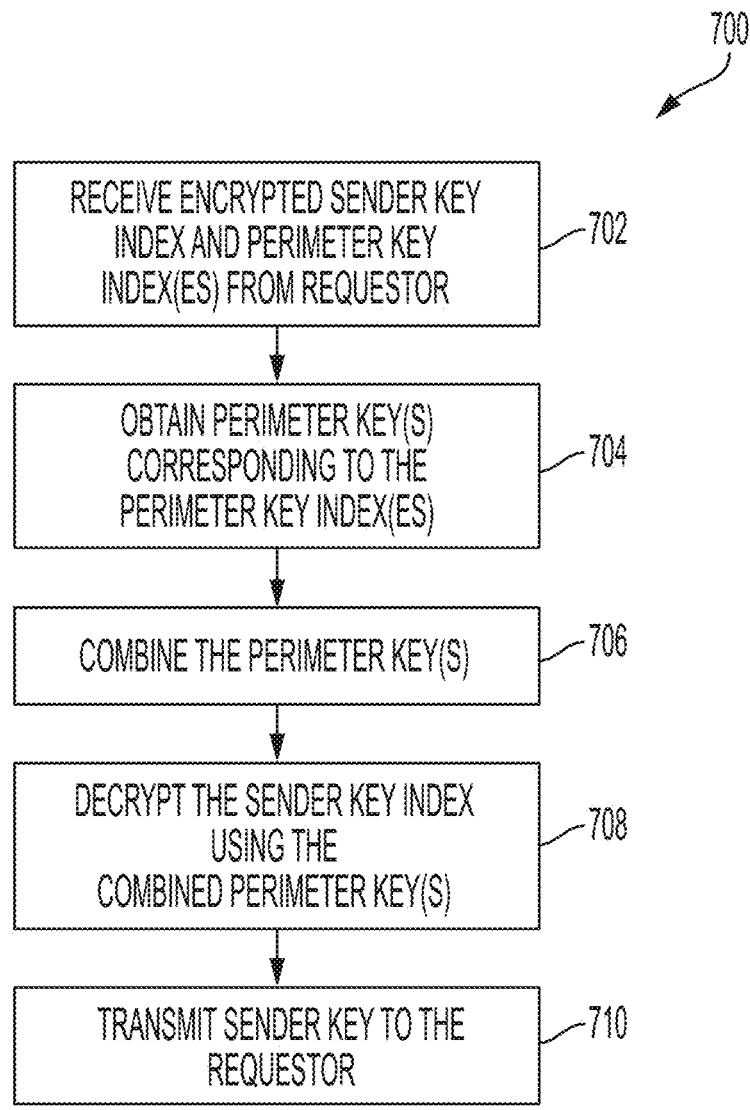
FIG. 7 depicts a flow diagram of a method for generating a sender key according to one or more embodiments of the present invention.

Turning now to FIG. 7, a flow diagram of a method 700 for generating a sender key is generally shown in accordance with one or more embodiments of the present invention. All or a portion of the processing shown in FIG. 7 can be performed, for example, by computer hardware and/or software instructions executing on KMS 110 of FIG. 1. At block 702, an encrypted sender key index and one or more perimeter key indexes are received from a requestor such as receiver system 106 of FIG. 1. At block 704, the perimeter key(s) corresponding to the one or more perimeter key indexes are obtained, for example from perimeter keys and indexes 114 of FIG. 1.

At block 706, if all of the perimeter keys corresponding to the one or more perimeter key indexes are valid and the requestor has access to all of them, then the perimeter keys are combined in the same manner that they were combined in block 506 of FIG. 5, and processing continues at block 708. If all of the perimeter keys corresponding to the one or more perimeter key indexes are not valid and/or the requestor does not have access to all of them, then the processing shown in FIG. 7 ends. In some embodiments an error message is sent to the requestor, and in other embodiment no error message is sent.

At block 708, if the sender key is valid and the requestor has access to the sender key, the sender key index is decrypted using the combined parameter keys and block 710 is performed to transmit the sender key to the requestor. At block 708, if the sender key is not valid and/or if the requestor does not have access to the sender key, then the processing shown in FIG. 7 ends. In some embodiments an error message is sent to the requestor, and in other embodiment no error message is sent.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
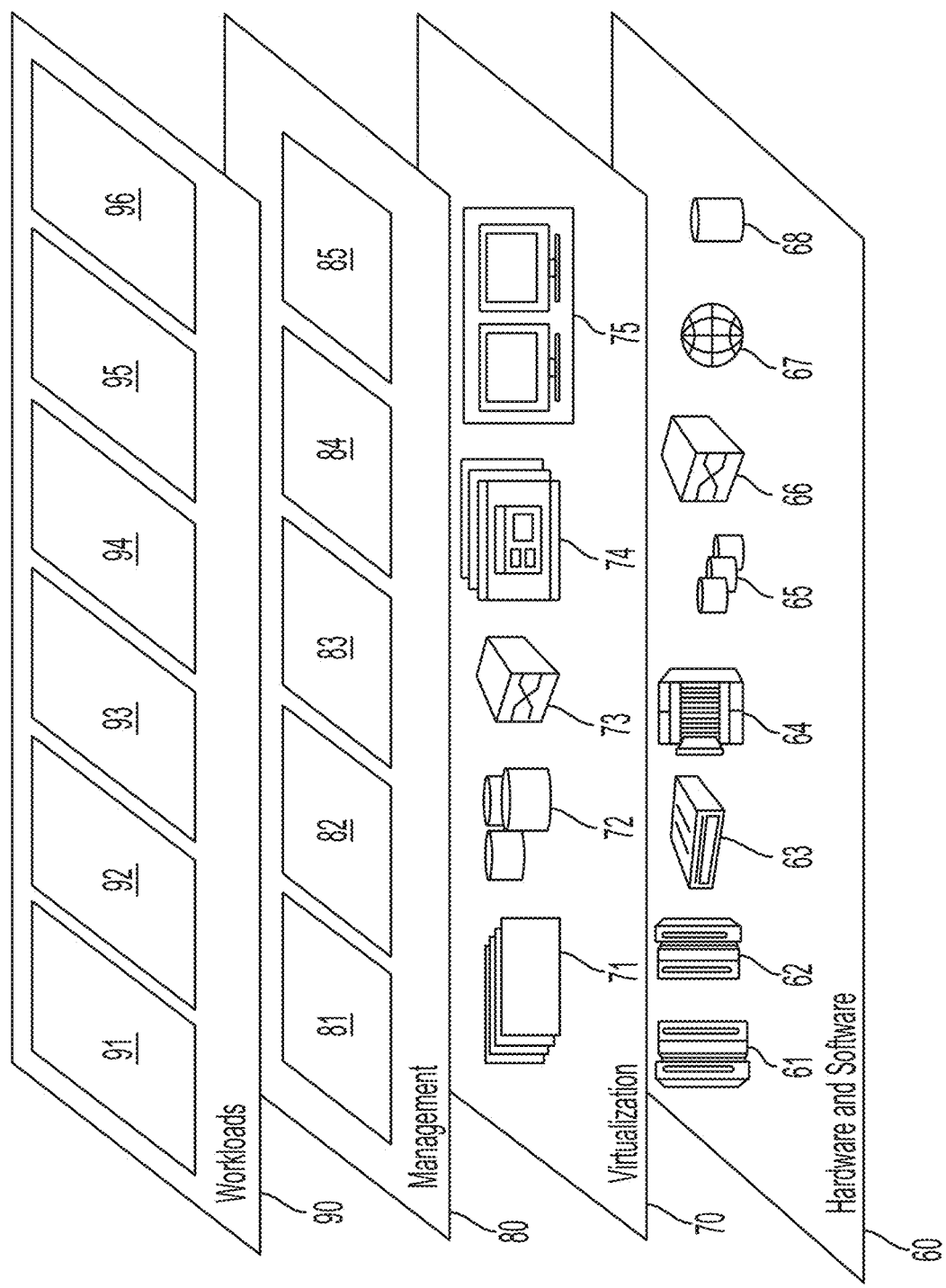
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data encryption/decryption 96.

It is understood that one or more embodiments of the present invention are capable of being implemented in conjunction with any type of computing environment now known or later developed.

Turning now to FIG. 10, a computer system for distributing encrypted data objects with encryption information as metadata is generally shown in accordance with one or more embodiments of the present invention. The methods described herein can be implemented in hardware, software (e.g., firmware), or a combination thereof. In one or more exemplary embodiments of the present invention, the methods described herein are implemented in hardware as part of the microprocessor of a special or general-purpose digital computer, such as a personal computer, workstation, minicomputer, or mainframe computer. The system 1000 therefore may include general-purpose computer or mainframe 1001 capable of running multiple instances of an O/S simultaneously.

In one or more exemplary embodiments of the present invention, in terms of hardware architecture, as shown in FIG. 10, the computer 1001 includes one or more processors 1005, memory 1010 coupled to a memory controller 1015, and one or more input and/or output (I/O) devices 1040, 1045 (or peripherals) that are communicatively coupled via a local input/output controller 1035. The input/output controller 1035 can be, for example but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 1035 may include a plurality of sub-channels configured to access the output devices 1040 and 1045. The sub-channels may include fiber-optic communications ports.

The processor 1005 is a hardware device for executing software, particularly that stored in storage 1020, such as cache storage, or memory 1010. The processor 1005 can be any custom made or commercially available processor, a central processing unit (CPU), an auxiliary processor among several processors associated with the computer 1001, a semiconductor based microprocessor (in the form of a microchip or chip set), a macroprocessor, or generally any device for executing instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, and/or other types of storage media. Note that the memory 1010 can have a distributed architecture, where various components are situated remote from one another, but can be accessed by the processor 1005.

The instructions in memory 1010 may include one or more separate programs, each of which comprises an ordered listing of executable instructions for implementing logical functions. In the example of FIG. 10, the instructions in the memory 1010 a suitable operating system (OS) 1011. The operating system 1011 essentially controls the execution of other computer programs and provides scheduling, input-output control, file and data management, memory management, and communication control and related services.

In accordance with one or more embodiments of the present invention, the memory 1010 may include multiple logical partitions (LPARs) each running an instance of an operating system. The LPARs may be managed by a hypervisor, which may be a program stored in memory 1010 and executed by the processor 1005.

In one or more exemplary embodiments of the present invention, a conventional keyboard 1050 and mouse 1055 can be coupled to the input/output controller 1035. Other output devices such as the I/O devices 1040, 1045 may include input devices, for example but not limited to a printer, a scanner, microphone, and the like. Finally, the I/O devices 1040, 1045 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1000 can further include a display controller 1025 coupled to a display 1030.

In one or more exemplary embodiments of the present invention, the system 1000 can further include a network interface 1060 for coupling to a network 1065. The network 1065 can be an IP-based network for communication between the computer 1001 and any external server, client and the like via a broadband connection. The network 1065 transmits and receives data between the computer 1001 and external systems. In an exemplary embodiment, network 1065 can be a managed IP network administered by a service provider. The network 1065 may be implemented in a wireless fashion, e.g., using wireless protocols and technologies, such as WiFi, WiMax, etc. The network 1065 can also be a packet-switched network such as a local area network, wide area network, metropolitan area network, Internet network, or other similar type of network environment. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1001 is a PC, workstation, intelligent device or the like, the instructions in the memory 1010 may further include a basic input output system (BIOS) (omitted for simplicity). The BIOS is a set of essential software routines that initialize and test hardware at startup, start the OS 1011, and support the transfer of data among the hardware devices. The BIOS is stored in ROM so that the BIOS can be executed when the computer 1001 is activated.

When the computer 1001 is in operation, the processor 1005 is configured to execute instructions stored within the memory 1010, to communicate data to and from the memory 1010, and to generally control operations of the computer 1001 pursuant to the instructions. In accordance with one or more embodiments of the present invention, computer 1001 is an example of a cloud computing node 10 of FIG. 8.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for distributing encrypted data objects performed by a sender computer of a sender, comprising:
    encrypting, by a processor, data based at least in part on a session key to generate encrypted data;
    encrypting, by the processor, the session key based at least in part on a sender key to generate an encrypted session key,
    the sender key previously obtained from a key management system (KMS);
    transmitting, by the processor, a request to the KMS for an encrypted sender key index, the request comprising an index of the sender key and an index of each of a plurality of additional keys, each of the plurality of additional keys is accessible by a defined group of users,
    wherein the sender key index is encrypted by the KMS using a combined key derived from a combination of the plurality of additional keys obtained based on the indices of the plurality of additional keys;
    receiving, by the processor, the encrypted sender key index from the KMS;
    generating, by the processor, an object that includes the encrypted data, the encrypted session key, the index of each of the plurality of additional keys, and the encrypted sender key index,
    wherein access to the data via the object is controlled based at least in part on whether a receiver has access to the sender key and to each of the plurality of additional keys, wherein access to each of the plurality of additional keys is based on user metadata indicating that the receiver is being defined in each group of users associated with each of the plurality of additional keys, wherein a user metadata is updated based on a change in a user's status.

2. The method of claim 1, wherein access to the data via the object is further controlled based at least in part on whether the sender key and the plurality of additional keys are valid.

3. The method of claim 2, further comprising preventing the receiver from accessing the data via the object, the preventing comprising transmitting a request to the KMS to invalidate the sender key.

4. The method of claim 2, further comprising preventing the receiver from accessing the data via the object, the preventing comprising transmitting a request to the KMS to invalidate at least one of the plurality of additional keys.

5. The method of claim 1, wherein access to the data via the object is modified in response to the KMS adding or removing the receiver from a list of users having access to the sender key.

6. The method of claim 1, wherein access to the data via the object is modified in response to the KMS adding or removing the receiver from a list of users having access to an additional key of the plurality of additional keys.

7. The method of claim 1, further comprising transmitting the object to the receiver.

8. The method of claim 7, wherein the transmitting is via a network.

9. A sending system of a sender for distributing encrypted data objects comprising: a memory for storing computer-readable instructions and one or more processors for executing the computer-readable instructions, the computer-readable instructions controlling the one or more processors to perform operations comprising:
    encrypting data based at least in part on a session key to generate encrypted data;
    encrypting the session key based at least in part on a sender key to generate an encrypted session key,
    the sender key previously obtained from a key management system (KMS);
    transmitting a request to the KMS for an encrypted sender key index,
    the request comprising an index of the sender key and an index of each of a plurality of additional keys, each of the plurality of additional keys is accessible by a defined group of users,
    wherein the sender key index is encrypted by the KMS using a combined key derived from a combination of the plurality of additional keys;
    receiving the encrypted sender key index from the KMS; and
    generating an object that includes the encrypted data, the encrypted session key, the index of each of the plurality of additional keys, and the encrypted sender key index,
    wherein access to the data via the object is controlled based at least in part on whether a receiver has access to the sender key and to each of the plurality of additional keys, wherein access to each of the plurality of additional keys is based on user metadata indicating that the receiver is being defined in each group of users associated with each of the plurality of additional keys, wherein a user metadata is updated based on a change in a user's status.

10. The system of claim 9, wherein access to the data via the object is further controlled based at least in part on whether the sender key and the plurality of additional keys are valid.

11. The system of claim 10, wherein the operations further comprise preventing the receiver from accessing the data via the object, the preventing comprising transmitting a request to the KMS to invalidate the sender key.

12. The system of claim 10, wherein the operations further comprise preventing the receiver from accessing the data via the object, the preventing comprising transmitting a request to the KMS to invalidate at least one of the plurality of additional keys.

13. The system of claim 9, wherein access to the data via the object is modified in response to the KMS adding or removing the receiver from a list of users having access to the sender key.

14. The system of claim 9, wherein access to the data via the object is modified in response to the KMS adding or removing the receiver from a list of users having access to an additional key of the plurality of additional keys.

15. A sender computer program product of a sender for distributing encrypted data objects, comprising a computer-readable storage medium having program instructions embodied therewith, the program instructions executable by a processor to cause the processor to perform operations comprising:

encrypting data based at least in part on a session key to generate encrypted data;

encrypting the session key based at least in part on a sender key to generate an encrypted session key, the sender key previously obtained from a key management system (KMS);

transmitting a request to the KMS for an encrypted sender key index, the request comprising an index of the sender key and an index of each of a plurality of additional keys, each of the plurality of additional keys is accessible by a defined group of users, wherein the sender key index is encrypted by the KMS using a combined key derived from a combination of the plurality of additional keys;

receiving the encrypted sender key index from the KMS; and generating an object that includes the encrypted data, the encrypted session key, the index of each of the plurality of additional keys, and the encrypted sender key index, wherein access to the data via the object is controlled based at least in part on whether a receiver has access to the sender key and to each of the plurality of additional keys, wherein access to each of the plurality of additional keys is based on user metadata indicating that the receiver is being defined in each group of users associated with each of the plurality of additional keys, wherein a user metadata is updated based on a change in a user's status.

16. A method for decrypting data objects performed by a receiver computer of a receiver comprising:

Receiving from a sender, by a processor, a data object that includes encrypted data, an encrypted session key, an index of each of a plurality of additional keys, and an encrypted sender key index, each of the plurality of additional keys is accessible by a defined group of users;

transmitting, by the processor, a request for a sender key corresponding to the encrypted sender key index to a key management system (KMS), the request from the receiver comprising the encrypted sender key index and the index of each of the plurality of additional keys, wherein the KMS, in response to the request, obtains each of the plurality of additional keys based on each respective index, decrypts the encrypted sender key index using a combined key derived from a combination of the obtained plurality of additional keys, and transmitting the sender key to the receiver based on the sender key index; and in response to receiving the sender key from the KMS:

decrypting the encrypted session key based at least in part on the sender key to generate a session key; and decrypting the encrypted data based at least in part on the session key to generate unencrypted data, wherein the sender key is sent to the receiver by the KMS in response to a determination by the KMS that the receiver has access to the sender key and to each of the plurality of additional keys, wherein access to each of the plurality of additional keys is based on user metadata indicating that the receiver is being defined in each group of users associated with each of the plurality of additional keys, wherein a user metadata is updated based on a change in a user's status.

17. The method of claim 16, further comprising receiving an error message from the KMS in response to a determination by the KMS that the receiver does not have access to the sender key.

18. The method of claim 17, wherein it is determined that the receiver does not have access to the sender key when the sender key is invalid.

19. The method of claim 16, further comprising receiving an error message from the KMS in response to a determination by the KMS that the receiver does not have access to all of the plurality of additional keys.

20. The method of claim 19, wherein it is determined that the receiver does not have access to all of the plurality of additional keys when at least one of the plurality of additional keys is invalid.

* * * * *